Patented Mar. 15, 1949

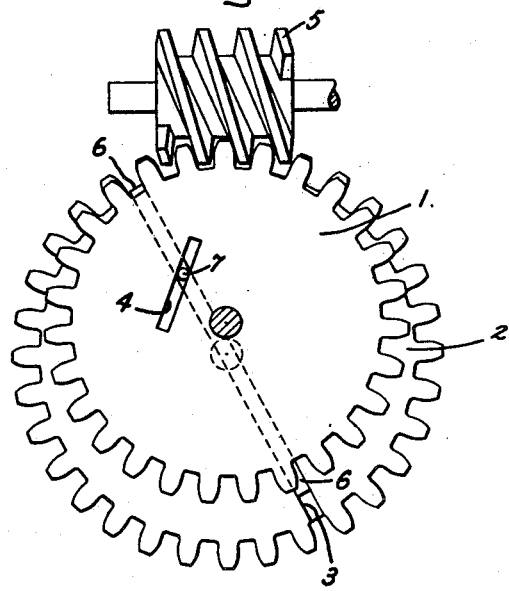
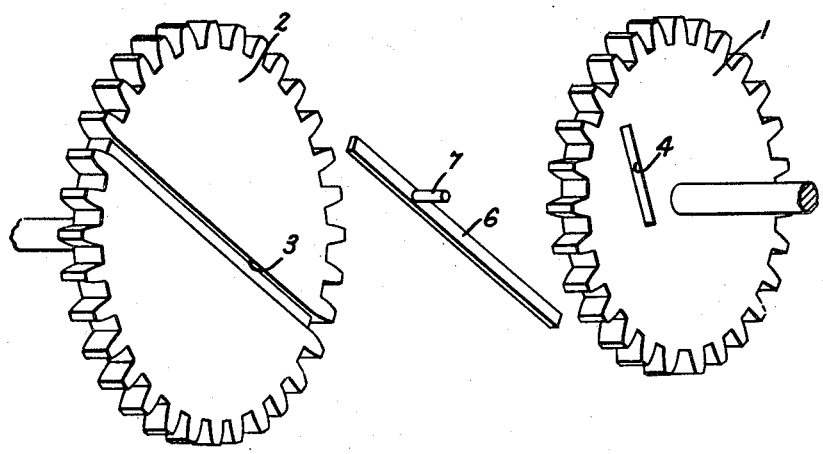

2,464,584

UNITED STATES PATENT OFFICE 2,464,584

GEAR STOP MECHANISM

Kenneth A. Kesselring, Scotia, N. Y., assignor to General Electric Company, a corporation of New York Application December 19, 1947, Serial No. 792,798

2 Claims. (Cl. 74—425)

My invention relates to gear stop mechanism, and its object is to provide apparatus for accomplishing stoppage of a rotary motion after the expiration of a predetermined number of revolutions in either direction.

It is a further object of my invention to provide improved apparatus of this type which is inexpensive, easily built, and small in bulk.

The features of my invention which are believed to be new and patentable are pointed out in the claims appended hereto. For a better understanding of my invention, reference is made in the following description to the accompanying drawing in which Fig. 1 is a plan view of one form of my invention, and Fig. 2 is an exploded view of the apparatus of Fig. 1 showing detailed construction of the parts.

Referring now to the drawing, two gears 1 and 2 of different diameters have unequal numbers of substantially identical teeth. These two gears are positioned as shown in Fig. 1 of the drawing with a face of each gear closely adjacent and parallel to a face of the other, and with their respective axes parallel and displaced by one-half the difference between their diameters. A diametric slot 3 is milled in the inner face of gear 2 as shown, and an oblique slot 4 is milled in the inner face of gear 1. Slot 4 may extend completely through the thickness of gear 1 as shown or may extend only part of the way through the gear. A worm 5 simultaneously engages both gears at the point where their edges are flush. A slider 6 rides in slot 3 and has a pin 7 which rides in slot 4 so that as one gear rotates relative to the other, the slider moves along slot 3 until one of its ends protrudes outside the slot. The diametric slot 3 may be in the smaller gear 1, and the oblique slot 4 in the larger gear 2, without changing the principle of my invention.

Since worm 5 engages both gear 1 and gear 2, it is evident that as worm 5 rotates both of the gears will rotate; however, since gear 2 has more teeth than gear 1 it will rotate at a slower speed so that gear 1 rotates relative to gear 2. Assume this rotation to be in a counter-clockwise direction. Then the action of pin 7 riding in oblique slot 4 will move slider 6 upwards to the left until one end of the slider protrudes outside the slot between two adjacent teeth of gear 2. As gear 2 rotates, the protruding portion of slider 6 will come in contact with worm 5 and prevent further rotation in that direction. Preferably, the parts are so proportioned that slider 6 protrudes sufficiently at the time of stoppage to make direct butting contact with the leading edge of worm 5. This avoids any wedging action which would tend to bind worm 5 in engagement with gears 1 and 2. After stoppage, the gears may be rotated in the other direction so that pin 7 riding in slot 4 will move slider 6 back into the slot and eventually cause the opposite end of the slider to protrude from the other end of slot 3. This will again stop rotation of the gears in the second direction. The number of rotations before stoppage can be varied over a wide range by the correct selection of gear tooth ratios, or by changing the length of the slider, or by changing the angle of slot 4.

It is evident that the driving means 5, represented as a worm, could likewise be a gear or pinion for some light-load uses. The worm is usually preferable, however, as it provides a more positive stop action. Another possible modification is to shorten the slider so that at no time does it protrude outside its slot. Rotation of the gears is then limited by the stopping of pin 7 in slot 4 at its extremes of travel. This is practicable only for light loads where there is considerable tolerance in the amount of permissible rotation; as otherwise slot 4 must have an extremely accurate length dimension and pin 7 must withstand relatively high shearing forces.

In accordance with the provisions of the patent statutes, I have described the principle of my invention, together with the apparatus which I now consider to represent the best embodiment thereof; but I wish it to be understood that the apparatus described is illustrative only, and that the invention can be carried out by other means.

What I claim as new and desire to secure by Letters Patent of the United States is:

1. Gear stop mechanism for limiting a rotary motion in a given direction comprising two gears having unequal numbers of substantially identical teeth, positioned with a face of each gear closely adjacent and parallel to a face of the other, one of the gears having a diametric slot in its inner face and the other having an oblique slot in its inner face, a driving means operatively engaging both gears simultaneously, and a slider riding in one of said slots and having a pin riding in the other slot.

2. In combination, two gears of different diameters having unequal numbers of substantially identical teeth, positioned with a face of each gear closely adjacent and parallel to a face of the other and with their respective axes parallel and displaced by one-half the difference between their diameters, one of the gears having a diametric slot in its inner face and the other having an oblique slot in its inner face, a worm operatively engaging both gears simultaneously, and a slider riding in the diametric slot and having a pin riding in the oblique slot so that as one gear rotates relative to the other the slider moves along the diametric slot until one end thereof protrudes outside the slot into engaging position with the leading edge of said worm to limit the rotation of the worm.

KENNETH A. KESSELRING.

REFERENCES CITED

The following references are of record in the file of this patent:

UNITED STATES PATENTS

| Number | Name | Date |
| --- | --- | --- |
| 1,203,840 | Bailey | Nov. 7, 1916 |
| 2,211,788 | Lucht | Aug. 20, 1940 |